US012608903B2

(12) United States Patent
Weston et al.

(10) Patent No.: US 12,608,903 B2
(45) Date of Patent: Apr. 21, 2026

(54) METHODS AND APPARATUS TO ESTIMATE TRAILER LOAD

(71) Applicant: Ford Global Technologies, LLC, Dearborn, MI (US)

(72) Inventors: Keith Weston, Canton, MI (US); Brendan Diamond, Grosse Pointe, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 18/482,462

(22) Filed: Oct. 6, 2023

(65) Prior Publication Data

US 2025/0118045 A1      Apr. 10, 2025

(51) Int. Cl.
*G06V 10/26*        (2022.01)
*G01G 19/12*        (2006.01)
*G06T 7/136*        (2017.01)
*G06T 7/155*        (2017.01)

(52) U.S. Cl.
CPC ............. *G06V 10/26* (2022.01); *G01G 19/12* (2013.01); *G06T 7/136* (2017.01); *G06T 7/155* (2017.01)

(58) Field of Classification Search
CPC ........ G06V 10/26; G06V 20/56; G01G 19/12; G06T 7/136; G06T 7/155
See application file for complete search history.

(56) References Cited

U.S. PATENT DOCUMENTS

| | | | |
|---|---|---|---|
| 10,161,746 B2 | 12/2018 | Ochsendorf et al. | |
| 10,628,690 B2 | 4/2020 | Herman et al. | |
| 10,906,406 B1 | 2/2021 | Healy | |
| 11,066,023 B1 * | 7/2021 | Johnson | G06T 7/194 |
| 11,282,227 B2 * | 3/2022 | Gupta | B60R 1/003 |
| 2017/0220887 A1 * | 8/2017 | Fathi | G06T 7/55 |
| 2018/0118476 A1 * | 5/2018 | Bastian, II | B65G 67/08 |
| 2019/0120723 A1 * | 4/2019 | Ebe | G06T 7/62 |
| 2019/0168773 A1 * | 6/2019 | Hamdoun | B60W 30/146 |
| 2019/0217831 A1 | 7/2019 | Mele | |
| 2020/0023811 A1 * | 1/2020 | Herman | B60R 25/01 |
| 2020/0079164 A1 * | 3/2020 | Finan | G06T 7/80 |
| 2020/0202544 A1 * | 6/2020 | Barish | G06T 7/55 |
| 2020/0317212 A1 * | 10/2020 | Rogness | B60D 1/248 |
| 2021/0386035 A1 * | 12/2021 | Liao | G06F 18/24 |
| 2021/0390307 A1 * | 12/2021 | Rogness | G06T 19/006 |
| 2022/0332250 A1 * | 10/2022 | Penaloza | G06T 7/80 |
| 2022/0398755 A1 * | 12/2022 | Herrmann | A61B 90/37 |
| 2023/0051632 A1 * | 2/2023 | Bellare | B60W 30/16 |

(Continued)

*Primary Examiner* — Ming Y Hon
(74) *Attorney, Agent, or Firm* — Lorne Forsythe; Hanley, Flight and Zimmerman, LLC

(57) ABSTRACT

Methods and apparatus to estimate trailer load are disclosed. An example apparatus comprises memory, instructions, and programmable circuitry to execute the instructions to determine a threshold value associated with at least one of a vehicle or a trailer, the trailer couplable to the vehicle, access an image containing an object to be placed in the trailer, divide the image into segments, at least one of the segments corresponding to the object, determine a characteristic of the object based on the at least one of the segments, compare the characteristic to the threshold value, and determine at least one operating characteristic of the vehicle based on the comparison.

20 Claims, 9 Drawing Sheets

(56)     References Cited

U.S. PATENT DOCUMENTS

| | | | |
|---|---|---|---|
| 2023/0249746 A1* | 8/2023 | Weston | B60W 30/18145 |
| | | | 280/426 |
| 2023/0406321 A1* | 12/2023 | Kuehnle | G07C 9/00 |
| 2024/0132054 A1* | 4/2024 | Weston | B60W 30/02 |
| 2024/0262322 A1* | 8/2024 | Castillo | B60D 1/06 |
| 2024/0270213 A1* | 8/2024 | Goodarzi | B60T 8/171 |
| 2025/0065888 A1* | 2/2025 | Lindenthal | B60W 30/02 |
| 2025/0212849 A1* | 7/2025 | Jeon | A01K 29/005 |
| 2025/0221871 A1* | 7/2025 | Golde | A61G 13/02 |
| 2025/0272944 A1* | 8/2025 | Jo | G06V 10/774 |

* cited by examiner

104 — VEHICLE CONTROL CIRCUITRY

200 — ACCESSING CIRCUITRY

202 — SEGMENTATION CIRCUITRY

204 — CHARACTERISTIC DETERMINATION CIRCUITRY

212 — IMAGE COMPARISON CIRCUITRY

214 — ASSOCIATION CIRCUITRY

206 — THRESHOLD DETERMINATION CIRCUITRY

208 — CHARACTERISTIC COMPARISON CIRCUITRY

210 — OPERATION DETERMINATION CIRCUITRY

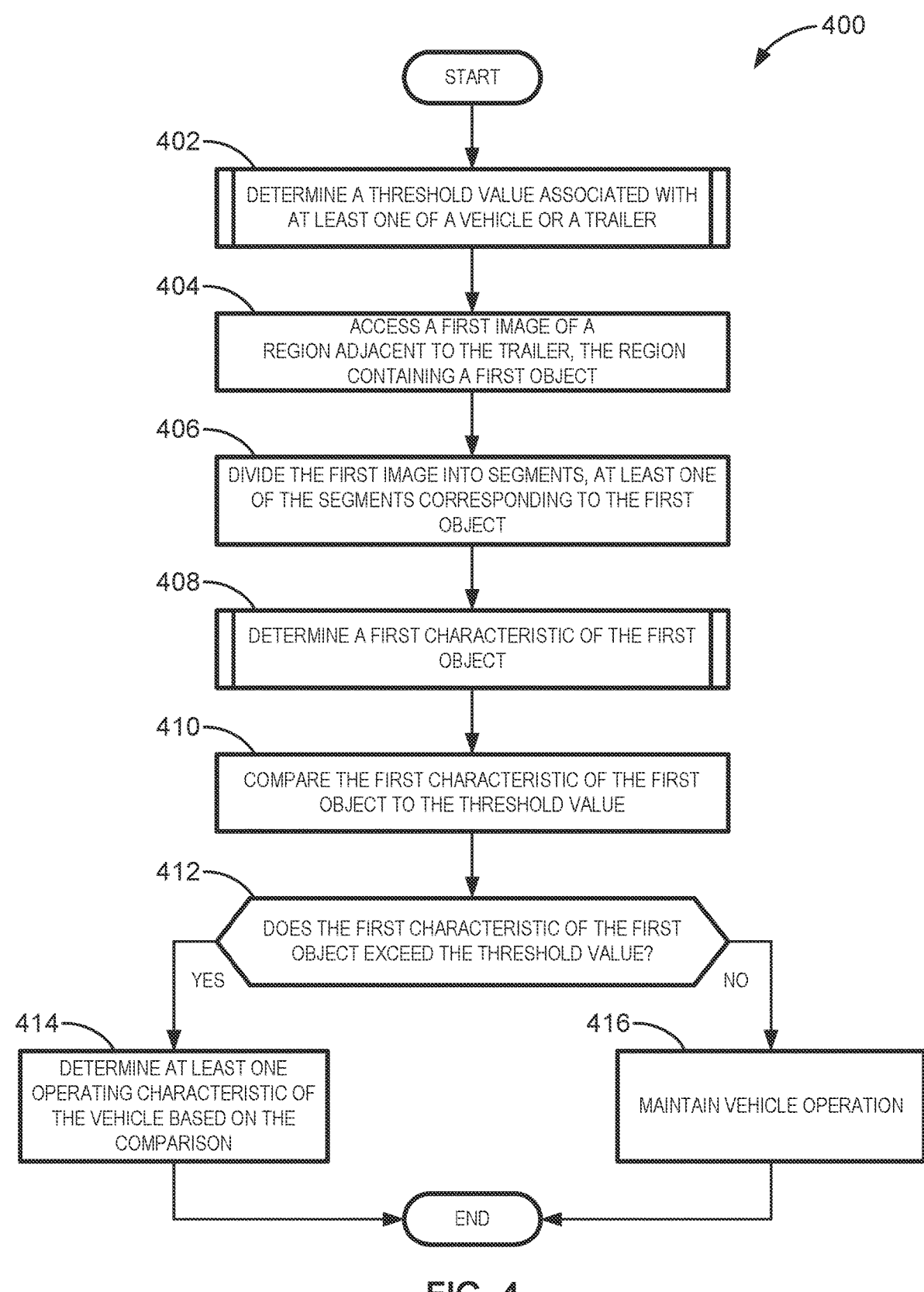

400

START

402
DETERMINE A THRESHOLD VALUE ASSOCIATED WITH AT LEAST ONE OF A VEHICLE OR A TRAILER

404
ACCESS A FIRST IMAGE OF A REGION ADJACENT TO THE TRAILER, THE REGION CONTAINING A FIRST OBJECT

406
DIVIDE THE FIRST IMAGE INTO SEGMENTS, AT LEAST ONE OF THE SEGMENTS CORRESPONDING TO THE FIRST OBJECT

408
DETERMINE A FIRST CHARACTERISTIC OF THE FIRST OBJECT

410
COMPARE THE FIRST CHARACTERISTIC OF THE FIRST OBJECT TO THE THRESHOLD VALUE

412
DOES THE FIRST CHARACTERISTIC OF THE FIRST OBJECT EXCEED THE THRESHOLD VALUE?

YES          NO

414
DETERMINE AT LEAST ONE OPERATING CHARACTERISTIC OF THE VEHICLE BASED ON THE COMPARISON

416
MAINTAIN VEHICLE OPERATION

END

FIG. 4

METHODS AND APPARATUS TO ESTIMATE TRAILER LOAD

FIELD OF THE DISCLOSURE

This disclosure relates generally to trailers and, more particularly, to methods and apparatus to estimate trailer load.

BACKGROUND

A trailer can be coupled to a vehicle to increase a hauling capacity of the vehicle. In some cases, the weight of a trailer on the vehicle can affect the steering and/or maneuvering capabilities of a vehicle.

BRIEF DESCRIPTION OF THE DRAWINGS

FIGS. 4-6 are flowcharts representative of example machine readable instructions and/or example operations that may be executed, instantiated, and/or performed by example programmable circuitry to implement the vehicle control circuitry of FIG. 2.

Figure 1:
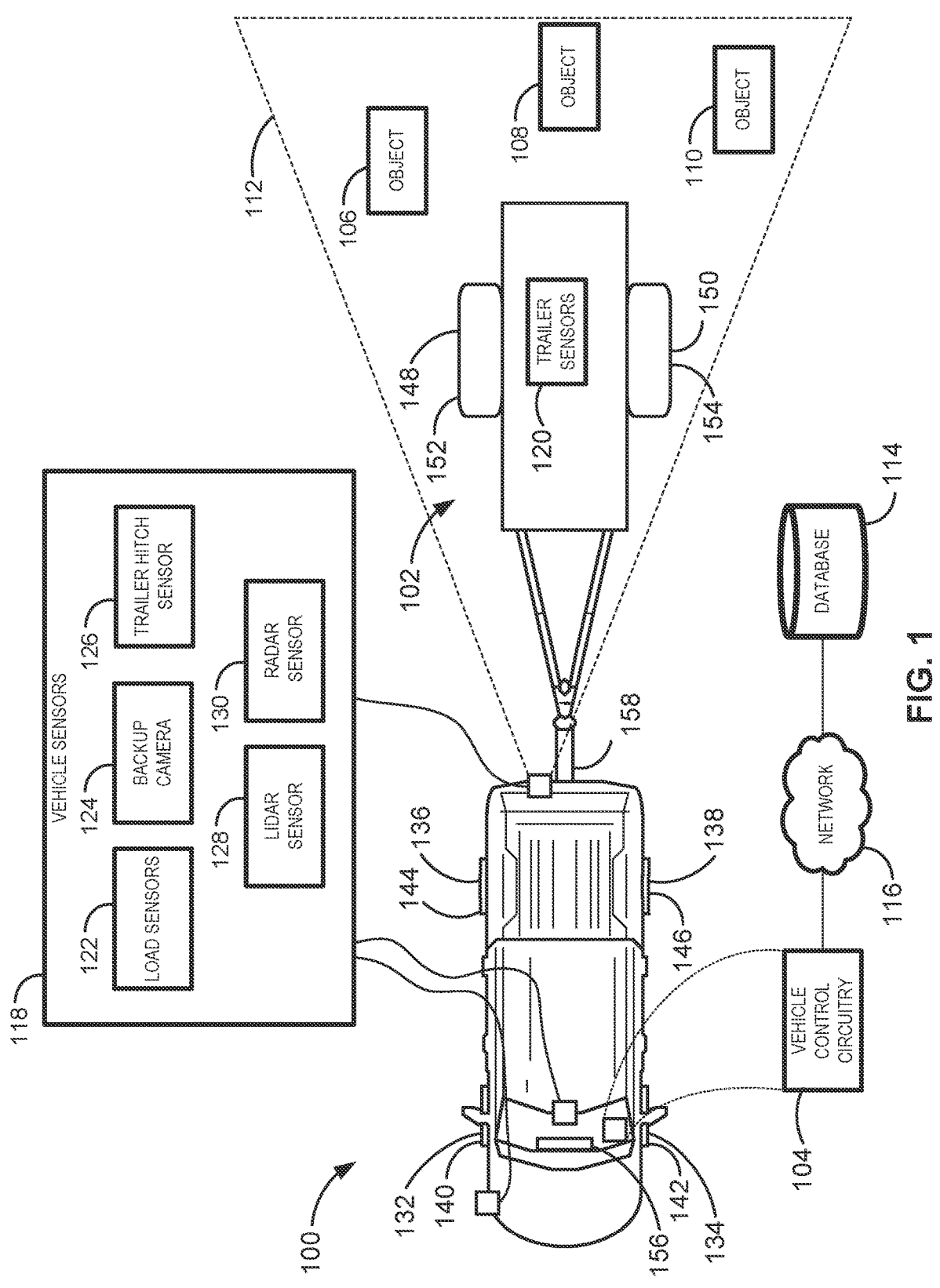
FIG. 1 illustrates an example vehicle and an example trailer, where the example vehicle implements example vehicle control circuitry in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

A trailer can be coupled to a vehicle to increase a towing capacity of the vehicle. In some examples, a weight of the trailer on the vehicle alters a load distribution of the vehicle, thus altering steering and/or maneuvering capabilities thereof.

Examples disclosed herein ensure performance of a vehicle and trailer by monitoring load capacity. Disclosed examples capture images of objects to be placed (e.g., loaded) onto an example trailer. Example vehicle control circuitry disclosed herein employs image recognition techniques and image segmentation techniques to determine characteristics (e.g., weight) of the objects. Thus, examples disclosed herein can compare the object characteristics to a load capacity of the vehicle or the trailer. In some disclosed examples, the vehicle control circuitry can notify an operator when the object characteristic (or a sum of characteristics associated with multiple objects) has exceeded a load capacity (e.g., via a user interface). Therefore, disclosed examples can prevent excessive trailer loads and improve the maneuverability and steering of an example vehicle-trailer system. Further, disclosed examples can capture images of an example trailer. As such, disclosed examples can utilize image recognition techniques to determine a load capacity of the trailer and notify an operator of the same.

FIG. 1 illustrates an example vehicle 100 and an example trailer 102 couplable to thereto. The example vehicle 100 implements example vehicle control circuitry 104 in accordance with teachings of this disclosure. In some examples, the vehicle control circuitry 104 monitors a load associated with the trailer 102 and/or the vehicle 100. For example, the vehicle control circuitry 104 can monitor example objects 106, 108, 110 to be placed (e.g., loaded) into and/or onto the trailer 102. In this example, the objects 106, 108, 110 are located in an example region 112 adjacent to the trailer 102. However, the example objects 106, 108, 110 can be located in any position with respect to the trailer 102 and/or the vehicle 100. The example vehicle control circuitry 104 is communicatively coupled to an example database 114 via an example network 116. In some examples, the database 114 is included in the vehicle control circuitry 104 and/or the vehicle 100. Further, the example vehicle control circuitry 104 is electrically and/or communicatively coupled to one or more example vehicle sensors 118 implemented on the vehicle 100 and/or one or more example trailer sensors 120 implemented on the trailer 102. In this example, the vehicle sensors 118 include example load sensors 122, an example backup camera (e.g., rear camera) 124, an example trailer hitch sensor 126, an example Light Detection and Ranging (LiDAR) sensor 128, and an example radar sensor 130.

The vehicle 100 includes example front vehicle wheels 132, 134 and example rear vehicle wheels 136, 138 having corresponding example vehicle brakes 140, 142, 144, 146 operatively coupled thereto. The example trailer 102 includes example trailer wheels 148, 150 having example trailer brakes 152, 154 operatively coupled thereto. In this example, the vehicle 100 further includes an example user interface 156, where the user interface 156 can include a display.

In the illustrated example of FIG. 1, the vehicle control circuitry 104 obtains and/or accesses sensor data from one or more of the vehicle sensors 118. In some examples, the load sensors 122 measure loads on the vehicle 100 at different locations of the vehicle 100. For example, the load sensors 122 can measure loads at one or more of the vehicle wheels 132, 134, 136, 138. Further, the example load sensors 122 can determine a total load on the vehicle 100. For example, the sum of the loads at each of the vehicle wheels 132, 134, 136, 138 can determine a total weight of the vehicle 100. In some examples, the load sensors 122 can include ride height sensors that can measure a distance between the vehicle 100 (or one or more locations of the vehicle 100) and an underlying road surface. Further, the load sensors 122 can include strain based sensors that can measure strain resulting from applied loads on the vehicle 100.

Similarly, the trailer hitch sensor 126 can measure loads from the trailer 102 on an example vehicle tongue 158. In some examples, the measured loads from the load sensors 122 and/or the trailer hitch sensor 126 can be provided in the sensor data to the vehicle control circuitry 104. For example, the example vehicle controller circuitry 104 can determine a weight of the trailer 102 via the measured loads on the vehicle tongue 158. In other examples, the vehicle controller circuitry 104 can estimate the weight of the trailer 102 based on a percentage (e.g., 15%) of the measured load on the vehicle tongue 158.

The example trailer sensors 120 can include one or more load sensors (coupled to the trailer 102) to measure a load (e.g., a weight) on the trailer 102. For example, the trailer sensors 120 can include ride height sensors (coupled to the trailer 102) that can measure a distance between the trailer 102 (or one or more locations of the trailer 102) and an underlying road surface. Further, the trailer sensors 120 can include strain based sensors (coupled to the trailer 102) that can measure strain resulting from applied loads on the trailer 102. In some examples, the vehicle control circuitry 104 obtains the measured load values from the trailer sensors 120. Additionally, the example vehicle control circuitry 104 can access a weight of the trailer 102 via at least one of the load sensors, the ride height sensors, or the strain based sensors.

In some examples, the LiDAR sensor 128, the radar sensor 130, and/or the backup camera 124 can be used to detect the objects 106, 108, 110. For example, the LiDAR sensor 128, the radar sensor 130, and/or the backup camera 124 can capture images of the objects 106, 108, 110. However, the LiDAR sensor 128, the radar sensor 130, and/or the backup camera 124 can capture images of the region 112 adjacent to (e.g., surrounding) the trailer 102. As such, the image of the region 112 may contain the objects 106, 108, 110. Further, the LiDAR sensor 128, the radar sensor 130, and/or the backup camera 124 can capture images of the trailer 102. In other words, the image of the region 112 may contain the trailer 102. In some examples, the image of the region 112 may contain a portion of the trailer 102, a portion of at least one of the objects 106, 108, 110, etc. In other examples, the trailer sensors 120 can include at least one of a LiDAR sensor, a radar sensor, or other camera to capture images of example objects (e.g., the objects 106, 108, 110) that have been placed onto the trailer 102. For example, if the trailer 102 is enclosed (e.g., by a roof, by a wall, etc.), then a LiDAR sensor, a radar sensor, or other camera positioned inside of the trailer 102 can capture images of the objects 106, 108, 110. Further, if the trailer 102 is enclosed and a rear of the trailer 102 is open (e.g., a back door of the trailer 102 is open), then a LiDAR sensor, a radar sensor, or other camera positioned inside of the trailer 102 can capture images of the objects 106, 108, 110 in a portion of the region 112 adjacent to the rear of the trailer 102.

Figure 2:
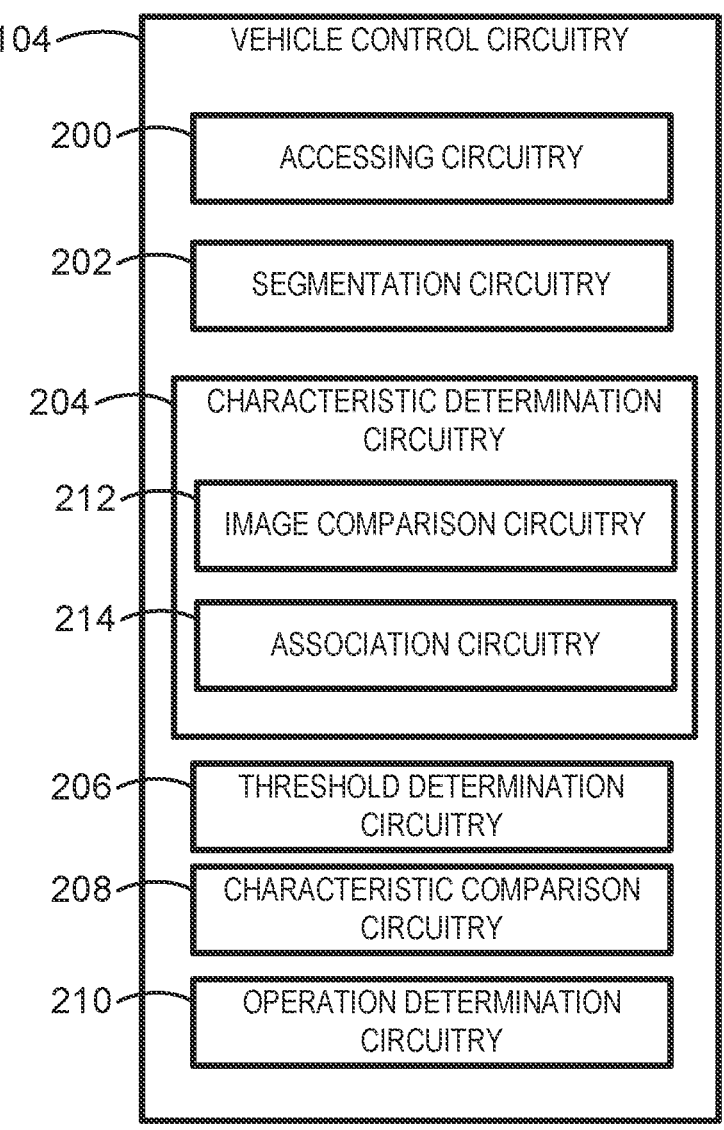
FIG. 2 is a block diagram of the example vehicle control circuitry of FIG. 1.

FIG. 2 is a block diagram of an example implementation of the vehicle control circuitry 104 of FIG. 1 to determine an operating characteristic of an example vehicle (e.g., the vehicle 100) based on a load on an example trailer (e.g., the trailer 102) coupled thereto. The example vehicle control circuitry 104 includes example accessing circuitry 200, example segmentation circuitry 202, example characteristic determination circuitry 204, example threshold determination circuitry 206, example characteristic comparison circuitry 208, and example operation determination circuitry 210. The example characteristic determination circuitry 204 includes example image comparison circuitry 212 and example association circuitry 214. The vehicle control circuitry 104 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the vehicle control circuitry 104 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example accessing circuitry 200 accesses an example image containing an example object to be placed in an example trailer. For example, the accessing circuitry 200 accesses an image containing at least one of the objects 106, 108, 110 to be placed in the trailer 102. In some examples, the accessing circuitry 200 accesses an image of the region 112 adjacent to the trailer 102, wherein at least one of the objects 106, 108, 110 is positioned within the region 112. Further, the example accessing circuitry 200 can access an image containing the trailer 102. For example, the accessing circuitry 200 can access an image of the region 112, wherein the trailer 102 is positioned within the region 112. In some examples, the accessing circuitry 200 can access the image of the region 112, the objects 106, 108, 110, and/or the trailer 102 via at least one of the LiDAR sensor 128, the radar sensor 130, or the backup camera 124. In some examples, the image containing the trailer 102 indicates at least one of a brand name of the trailer 102, a product number of the trailer 102, or a product name of the trailer 102. In some examples, the image containing the at least one of the objects 106, 108, 110 indicates at least one of a brand name of the at least one of the objects 106, 108, 110, a product number of the at least one of the objects 106, 108, 110, or a product name of the at least one of the objects 106, 108, 110.

In some examples, the accessing circuitry 200 accesses an example image corresponding to an example reference object and/or an example reference trailer. For example, the accessing circuitry 200 can access an image corresponding to a reference object and/or a reference trailer via the network 116. In some examples, the accessing circuitry 200 can access an image corresponding to a reference object and/or a reference trailer from the database 114 via the network 116. In other examples, the accessing circuitry 200 can access an image corresponding to a reference object and/or a reference trailer from an Internet via the network 116. In some examples, the accessing circuitry 200 is instantiated by programmable circuitry executing accessing instructions and/or configured to perform operations such as those represented by the flowchart(s) of FIGS. 4-6.

In some examples, the vehicle control circuitry 104 includes means for accessing an image. For example, the means for accessing may be implemented by the example accessing circuitry 200. In some examples, the accessing circuitry 200 may be instantiated by programmable circuitry such as the example programmable circuitry 712 of FIG. 7. For instance, the accessing circuitry 200 may be instantiated by the example microprocessor 800 of FIG. 8 executing machine executable instructions such as those implemented by at least block 404 of FIG. 4, block 502 of FIG. 5, and block 600 of FIG. 6. In some examples, the accessing circuitry 200 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the accessing circuitry 200 may be instantiated by any other combination of hardware, software, and/or firmware. For example, the accessing circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example segmentation circuitry 202 divides (e.g., segments) the example image into segments. In some examples, the segmentation circuitry 202 divides the image of the region 112 into segments. As such, a first one of the segments in the image of the region 112 can correspond to the object 106, a second one of the segments in the image of the region 112 can correspond to the object 108, and a third one of the segments in the image of the region 112 can correspond to the object 110. In some examples, a fourth one of the segments in the image of the region 112 can correspond to the trailer 102. In some examples, the segmentation circuitry 202 divides the image of the object 106 into segments. For example, at least one of the segments in the image of the object 106 can correspond to at least one of a brand name of the object 106, a product number of the object 106, or a product name of the object 106. In some examples, the segmentation circuitry 202 divides the image of the trailer 102 into segments. For example, at least one of the segments in the image of the trailer 102 can correspond to at least one of a brand name of the trailer 102, a product number of the trailer 102, or a product name of the trailer 102. In some examples, the segmentation circuitry 202 divides an example image into segments via image segmentation techniques (e.g., watershed segmentation, K-means clustering, etc.). As used herein, "image segmentation" refers to the process of partitioning a digital image into multiple segments of sets of pixels. For example, segmentation may include determining, for each pixel of an image, a particular segment to which the pixel belongs. In some examples, the segmentation circuitry 202 is instantiated by programmable circuitry executing segmentation instructions and/or configured to perform operations such as those represented by the flowchart(s) of FIGS. 4 and 5.

In some examples, the vehicle control circuitry 104 includes means for dividing an image. For example, the means for dividing may be implemented by the segmentation circuitry 202. In some examples, the segmentation circuitry 202 may be instantiated by programmable circuitry such as the example programmable circuitry 712 of FIG. 7. For instance, the segmentation circuitry 202 may be instantiated by the example microprocessor 800 of FIG. 8 executing machine executable instructions such as those implemented by at least block 406 of FIG. 4 and block 500 of FIG. 5. In some examples, the segmentation circuitry 202 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the segmentation circuitry 202 may be instantiated by any other combination of hardware, software, and/or firmware. For example, the segmentation circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example characteristic determination circuitry 204 determines (e.g., calculates, estimates, etc.) an example characteristic of the example object based on at least one of the segments. For example, the characteristic determination circuitry 204 determines a characteristic of the object 106 based on the segment in the image corresponding to the object 106. In some examples, the characteristic determination circuitry 204 determines an example characteristic of the trailer 102. For example, the characteristic determination circuitry 204 determines a characteristic of the trailer 102 based on the segment in the image corresponding to the trailer 102. As used herein, a "characteristic" refers to, for example, a dimension, a weight, a height, a width, a volume, or a density of an example object or an example trailer. Further, an example characteristic can refer to any qualitative and/or quantitative description of an example object and/or an example trailer. For example, an example characteristic can indicate that the example object is at least partially covered in mud, grass, water, etc.

The example characteristic determination circuitry 204 includes the image comparison circuitry 212 and the association circuitry 214. The example image comparison circuitry 212 compares the at least one of the segments corresponding to the object 106 to another example image corresponding to a reference object. In this example, the reference object has a reference characteristic (e.g., a known characteristic). For example, the reference object can include a lawn mower having a reference characteristic such as a weight of 300 pounds (lbs.). The example image comparison circuitry 212 can compare the image of the lawn mower to the segment corresponding to the object 106. For example, the image comparison circuitry 212 can determine that pixels in the image of the lawn mower match the pixels in the segment corresponding to the object 106. The example association circuitry 214 can associate (e.g., link, pair, etc.) the object 106 with the reference object when the segment corresponding to the object 106 matches the image containing the reference object. For example, the association circuitry 214 can associate the object 106 with the lawn mower when the segment corresponding to the object 106 matches the image containing the lawn mower. Then, the characteristic determination circuitry 204 can determine a characteristic of the object 106 based on the known characteristic of the reference object. For example, the characteristic determination circuitry 204 can determine that the object 106 may weigh 300 lbs. because the matching reference object weighs 300 lbs. In some examples, the characteristic determination circuitry 204 can determine that the object 106 is the reference object and, as such, has the reference characteristic (and any other reference characteristics) of the reference object. In some examples, the segment corresponding to the object 106 matches the image containing the reference object when a threshold number of pixels (e.g., 50% of the pixels, 95% of the pixels, etc.) in the image of the reference object matches the pixels in the segment corresponding to the object 106.

Similarly, the example characteristic determination circuitry 204 can determine an example characteristic of the trailer 102. For example, the image comparison circuitry 212 compares the segment corresponding to the trailer 102 to another example image corresponding to a reference trailer. In this example, the reference trailer has a reference characteristic (e.g., a known characteristic). For example, the reference trailer can be a flatbed trailer having a reference characteristic such as a towing capacity of 7,400 lbs. The example image comparison circuitry 212 can compare the image of the reference trailer to the segment corresponding to the trailer 102. The example association circuitry 214 can associate the trailer 102 with the reference trailer when the segment corresponding to the trailer 102 matches the image containing the reference trailer. For example, the association circuitry 214 can associate the trailer 102 with the flatbed trailer when the segment corresponding to the trailer 102 matches the image containing the flatbed trailer. Then, the characteristic determination circuitry 204 can determine a characteristic of the trailer 102 based on the known characteristic of the reference trailer. For example, the characteristic determination circuitry 204 can determine that the trailer 102 may have a towing capacity of 7,400 lbs. because the reference trailer has a towing capacity of 7,400 lbs. In some examples, the characteristic determination circuitry 204 can determine that the trailer 102 is the reference trailer and, as such, has the reference characteristic (and any other reference characteristics) of the reference trailer. In some examples, the segment corresponding to the trailer 102 may indicate a product name of the trailer 102. Accordingly, the association circuitry 214 can associate the trailer 102 with the reference trailer when the product name of the trailer 102 matches a product name of the reference trailer.

In some examples, the characteristic determination circuitry 204 can determine a characteristic for at least one of the objects 106, 108, 110, or the trailer 102. Further, the example characteristic determination circuitry 204 can determine a sum of the characteristics for multiple ones of the objects 106, 108, 110. For example, the characteristic determination circuitry 204 can determine that the summed characteristic is 650 lbs. if the object 106 weighs 300 lbs. and the object 108 weighs 350 lbs.

Figure 5:
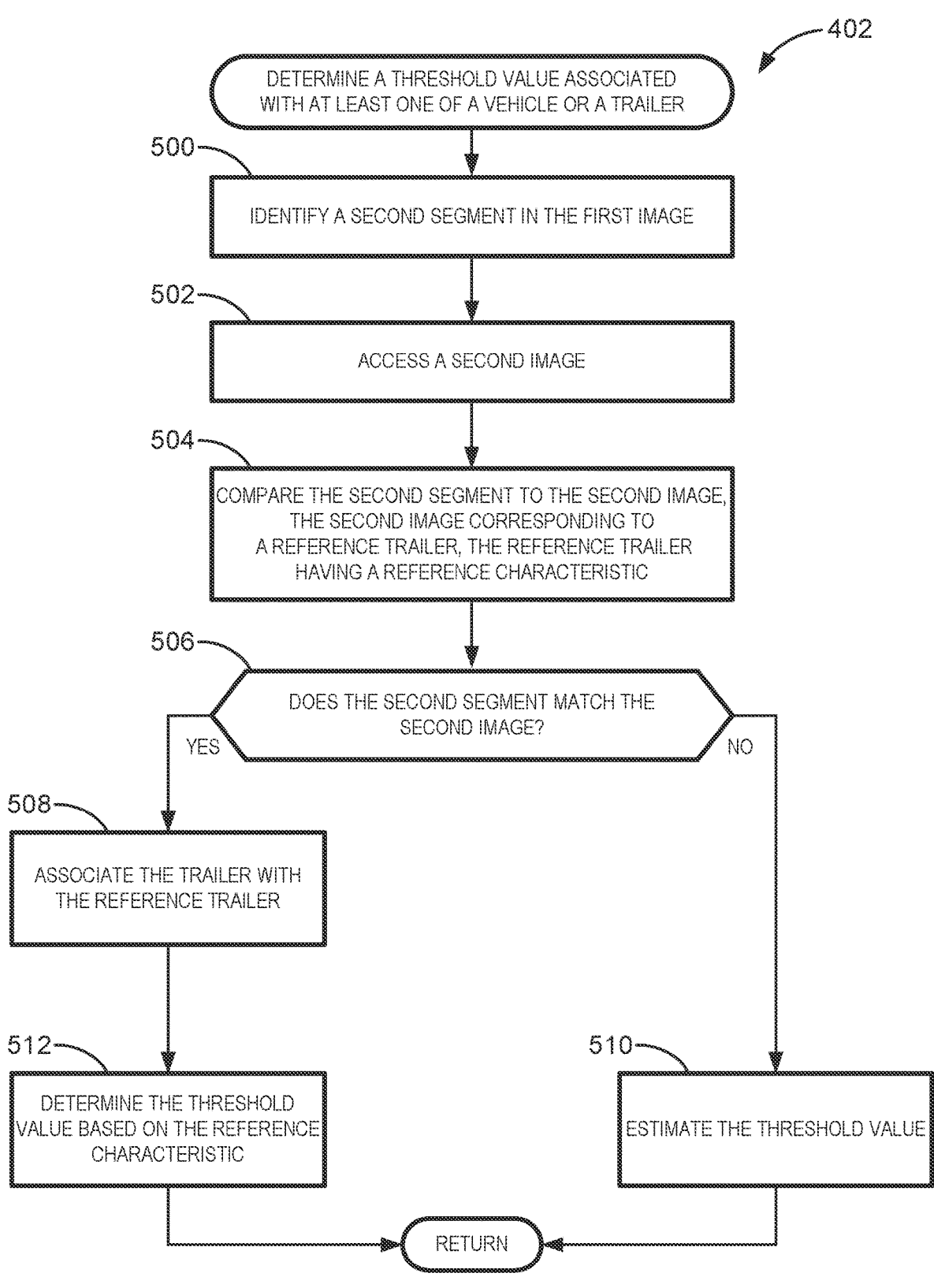
Figure 6:
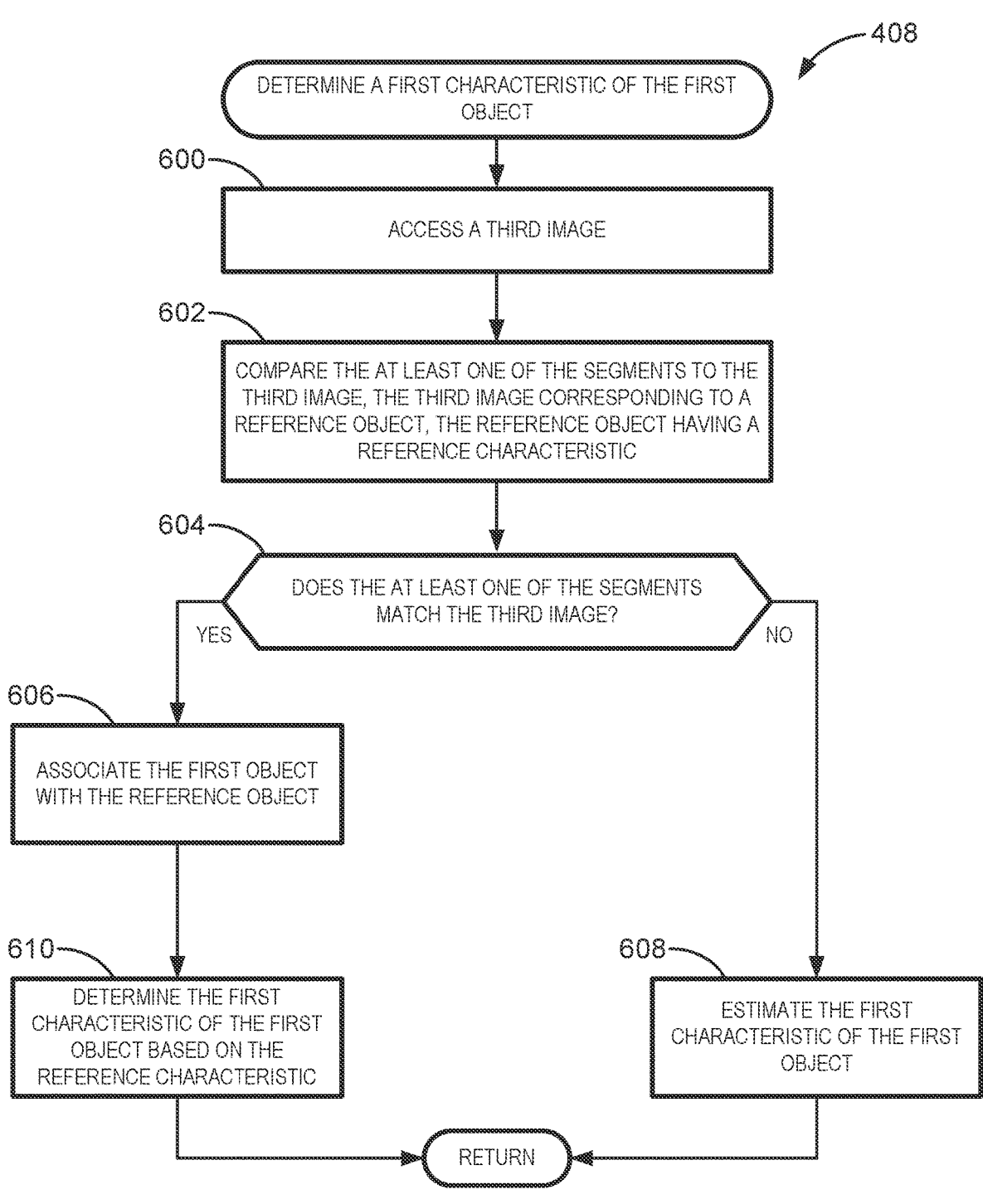

In some examples, the characteristic determination circuitry 204 is instantiated by programmable circuitry executing characteristic determination instructions and/or configured to perform operations such as those represented by the flowchart(s) of FIGS. 4-6. In some examples, the image comparison circuitry 212 is instantiated by programmable circuitry executing image comparison instructions and/or configured to perform operations such as those represented by the flowchart(s) of FIGS. 5 and 6. In some examples, the association circuitry 214 is instantiated by programmable circuitry executing associating instructions and/or configured to perform operations such as those represented by the flowchart(s) of FIGS. 5 and 6.

In some examples, the vehicle control circuitry 104 includes first means for determining a characteristic. For example, the first means for determining may be implemented by characteristic determination circuitry 204. In some examples, the characteristic determination circuitry 204 may be instantiated by programmable circuitry such as the example programmable circuitry 712 of FIG. 7. For instance, the characteristic determination circuitry 204 may be instantiated by the example microprocessor 800 of FIG. 8 executing machine executable instructions such as those implemented by at least blocks 408 of FIG. 4 and blocks 608, 610 of FIG. 6. In some examples, the characteristic determination circuitry 204 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the characteristic determination circuitry 204 may be instantiated by any other combination of hardware, software, and/or firmware. For example, the characteristic determination circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the first means for determining includes first means for comparing images. For example, the first means for comparing may be implemented by image comparison circuitry 212. In some examples, the image comparison circuitry 212 may be instantiated by programmable circuitry such as the example programmable circuitry 712 of FIG. 7. For instance, the image comparison circuitry 212 may be instantiated by the example microprocessor 800 of FIG. 8 executing machine executable instructions such as those implemented by at least blocks 504, 506 of FIG. 5 and block 602, 604 of FIG. 6. In some examples, the image comparison circuitry 212 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the image comparison circuitry 212 may be instantiated by any other combination of hardware, software, and/or firmware. For example, the image comparison circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the first means for determining includes means for associating. For example, the means for associated may be implemented by association circuitry 214. In some examples, the association circuitry 214 may be instantiated by programmable circuitry such as the example programmable circuitry 712 of FIG. 7. For instance, the association circuitry 214 may be instantiated by the example microprocessor 800 of FIG. 8 executing machine executable instructions such as those implemented by at least blocks 508 of FIG. 5 and block 606 of FIG. 6. In some examples, the association circuitry 214 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the association circuitry 214 may be instantiated by any other combination of hardware, software, and/or firmware. For example, the association circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example threshold determination circuitry 206 determines an example threshold value associated with at least one of an example vehicle or an example trailer. The example threshold determination circuitry 206 can determine an example threshold value associated with at least one of the vehicle 100 or the trailer 102. For example, the threshold determination circuitry 206 can determine that the vehicle 100 has a maximum towing capacity of 14,000 lbs. As such, the threshold determination circuitry 206 can define the threshold value as 14,000 lbs. In some examples, the threshold determination circuitry 206 can determine that the trailer 102 has a maximum towing capacity of 7,000 lbs. As such, the threshold determination circuitry 206 can define the threshold value as 7,000 lbs. In some examples, the threshold determination circuitry 206 can determine that the vehicle tongue 158 has a maximum towing capacity of 1,000 lbs. As such, the threshold determination circuitry 206 can define the threshold value as 1,000 lbs. In some examples, the threshold determination circuitry 206 can determine the threshold value based on a current load on the trailer 102. For example, if the current load on the trailer 102 (e.g., sum of the weights of example objects placed on the trailer 102) is 6,500 lbs. and the towing capacity of the trailer 102 is 7,000 lbs., then the threshold determination circuitry 206 can determine that the threshold value is 500 lbs. (e.g., 7,000 lbs.−6,500 lbs.=500 lbs.).

In other examples, the threshold determination circuitry 206 can define the threshold value based on any reference characteristic associated with the trailer 102. For example, the threshold determination circuitry 206 can define the threshold value based on a volume capacity (e.g., a maximum amount of available three dimensional (3D) space) associated with the trailer 102. If the example trailer 102 has a volume capacity of 1,120 feet cubed ($ft^3$) (e.g., 8 ft tall*7 ft wide*20 ft long=1,120 $ft^3$), then the example threshold determination circuitry 206 can define the threshold value as 1,120 $ft^3$. In some examples, the threshold determination circuitry 206 can access a reference characteristic associated with the trailer 102 via the database 114, the network 116, the characteristic determination circuitry 204, etc. In some examples, the threshold determination circuitry 206 is instantiated by programmable circuitry executing threshold determination instructions and/or configured to perform operations such as those represented by the flowchart(s) of FIGS. 4 and 5.

In some examples, the vehicle control circuitry 104 includes second means for determining a threshold value. For example, the second means for determining may be implemented by threshold determination circuitry 206. In some examples, the threshold determination circuitry 206 may be instantiated by programmable circuitry such as the example programmable circuitry 712 of FIG. 7. For instance, the threshold determination circuitry 206 may be instantiated by the example microprocessor 800 of FIG. 8 executing machine executable instructions such as those implemented by at least blocks 402 of FIG. 4 and blocks 510, 512 of FIG. 5. In some examples, the threshold determination circuitry 206 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the threshold determination circuitry 206 may be instantiated by any other combination of hardware, software, and/or firmware. For example, the threshold determination circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example characteristic comparison circuitry 208 compares the characteristic of the example object or the example trailer to the threshold value. In some examples, the characteristic comparison circuitry 208 can compare the characteristic of at least one of the objects 106, 108, 110 to the threshold value. For example, the characteristic comparison circuitry 208 can compare the 300 lb. weight of the object 106 to the threshold value of 7,000 lbs. (e.g., the towing capacity of the trailer 102). Accordingly, the characteristic comparison circuitry 208 can determine that the 300 lb. weight of the object does not exceed (e.g., satisfies) the threshold value (e.g., 300 lbs.<7,000 lbs.). In other examples, the object 106 may have a volume of 1,500 $ft^3$ and the threshold value may be 1,120 $ft^3$ (e.g., the volume capacity of the trailer 102). Accordingly, the characteristic comparison circuitry 208 can determine that the volume of the object 106 exceeds the threshold value (e.g., 1,500 $ft^3$>1,120 $ft^3$). Further, the example characteristic comparison circuitry 208 can determine a percentage of the threshold value that has been exceeded. For example, if the threshold value is 1000 lbs. and the weight of the object 106 is 1,050 lbs., then the characteristic comparison circuitry 208 can determine that the weight of the object 106 exceeds the threshold value by 5% (e.g., ((1050/1000)−1)*100=5%).

In some examples, the characteristic comparison circuitry 208 can compare the characteristic of the trailer 102 to the threshold value. For example, the characteristic comparison circuitry 208 can compare a weight of the trailer 102 to the towing capacity of the vehicle 100. In some examples, the weight of the trailer 102 is 4,000 lbs. and the towing capacity of the vehicle 100 is 10,000 lbs. Accordingly, the characteristic comparison circuitry 208 can determine that the weight of the trailer 102 (e.g., 4,000 lbs.) does not exceed to the threshold value based on the vehicle 100 (e.g., 10,000 lbs. towing capacity of the vehicle 100). In some examples, the characteristic comparison circuitry 208 is instantiated by programmable circuitry executing characteristic comparison instructions and/or configured to perform operations such as those represented by the flowchart of FIG. 4.

In some examples, the vehicle control circuitry 104 includes second means for comparing characteristics. For example, the second means for comparing may be implemented by the characteristic comparison circuitry 208. In some examples, the characteristic comparison circuitry 208 may be instantiated by programmable circuitry such as the example programmable circuitry 712 of FIG. 7. For instance, the characteristic comparison circuitry 208 may be instantiated by the example microprocessor 800 of FIG. 8 executing machine executable instructions such as those implemented by at least blocks 410, 412 of FIG. 4. In some examples, the characteristic comparison circuitry 208 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the characteristic comparison circuitry 208 may be instantiated by any other combination of hardware, software, and/or firmware. For example, the characteristic comparison circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example operation determination circuitry 210 determines at least one operating characteristic of the vehicle 100 based on the comparison. In some examples, an operating characteristic of the vehicle 100 can include a speed (e.g., a maximum allowable speed) of the vehicle, a route associated with the vehicle 100, a message (e.g., notification) to an operator of the vehicle 100, etc. In some examples, the operation determination circuitry 210 can determine at least one operating characteristic of the vehicle 100 when the comparison indicates that the threshold value has been exceeded (e.g., exceeded by 5%, exceeded by 10%, etc.). For example, when the threshold value (e.g., towing capacity of the trailer 102) has been exceeded, the operation determination circuitry 210 can notify an operator of the vehicle 100 that the threshold value has been exceeded (e.g., via the user interface 156). In other examples, the operation determination circuitry 210 can determine an action of the vehicle 100 when the threshold value has been exceeded. For example, the operation determination circuitry 210 can determine a route (e.g., path) for the vehicle 100 to execute to avoid sharp turns, avoid unpaved roads, avoid highways, etc. In some examples, the operation determination circuitry 210 can identify which of the object(s) 106, 108, 110 to remove (e.g., offload) to satisfy the threshold value.

In some examples, the operation determination circuitry 210 can determine a speed limit for the vehicle 100 when the threshold value has been exceeded. For example, the operation determination circuitry 210 can determine that the vehicle 100 should not exceed a speed of 25 miles per hour (mph). Further, the example operation determination circuitry 210 can notify an operator of the vehicle 100 of the speed limit (e.g., recommended speed limit). In some examples, the operation determination circuitry 210 can prevent the vehicle 100 from exceeding the speed limit. For example, the operation determination circuitry 210 can operate (e.g., control) the vehicle brakes 140, 142, 144, 146 and/or rotation of the vehicle wheels 132, 134, 136, 138. Additionally or alternatively, the operation determination circuitry 210 can operate the trailer brakes 152, 154 and/or rotation of the trailer wheels 148, 150. In some examples, the operation determination circuitry 210 is instantiated by programmable circuitry executing operation determination instructions and/or configured to perform operations such as those represented by the flowchart of FIG. 4.

In some examples, the vehicle control circuitry 104 includes third means for determining an operation of the vehicle. For example, the third means for determining may be implemented by the operation determination circuitry 210. In some examples, the operation determination circuitry 210 may be instantiated by programmable circuitry such as the example programmable circuitry 712 of FIG. 7. For instance, the operation determination circuitry 210 may be instantiated by the example microprocessor 800 of FIG.

8 executing machine executable instructions such as those implemented by at least blocks 414, 416 of FIG. 4. In some examples, the operation determination circuitry 210 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the operation determination circuitry 210 may be instantiated by any other combination of hardware, software, and/or firmware. For example, the operation determination circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 3:
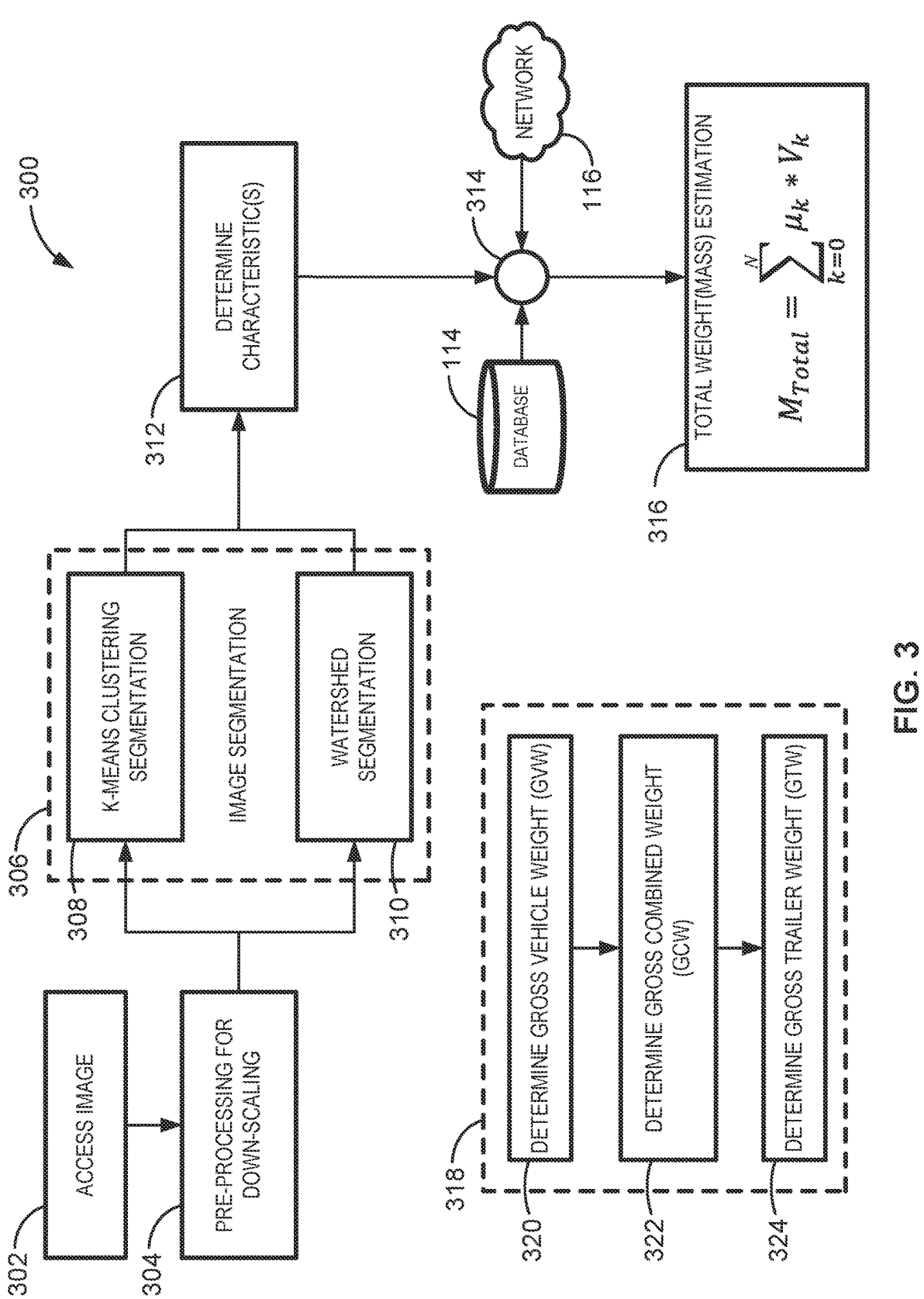
FIG. 3 illustrates an example process flow to implement the example vehicle control circuitry of FIG. 1.

FIG. 3 illustrates an example process flow 300 to implement the example vehicle control circuitry 104. The example process flow begins at block 302, at which the accessing circuitry 200 accesses an example input image. The example accessing circuitry 200 can be communicatively coupled to at least one of the example vehicle sensors 118 (e.g., the LiDAR sensor 128, the radar sensor 130, the backup camera 124, etc.) to access the input image. For example, at least one of the LiDAR sensor 128, the radar sensor 130, or the backup camera 124 can capture an image (e.g., input image) of the trailer 102, the object 106, the object 108, the object 110, the region 112 containing the objects 106, 108, 110 and the trailer 102, etc.

At block 304, the segmentation circuitry 202 pre-processes (e.g., processes) the input image for downscaling. In some examples, prior to providing the image as an input to an image segmentation algorithm, the segmentation circuitry 202 downscales the image. For example, the segmentation circuitry 202 can generate a scaled image from the input image by downscaling the input image to a lower resolution using any appropriate downscaling technique. The example scaled image has a smaller data size than the raw input image. In some examples, the smaller data size of the scaled frame enables quicker, more efficient segmentation compared to the lengthier process of segmenting a raw input image having a larger data size.

At block 306, the example image is provided to either a K-means clustering segmentation algorithm (block 308) or a watershed segmentation algorithm (block 310). At block 308, the example segmentation circuitry 202 can access (e.g., employ, utilize, etc.) a K-means clustering segmentation algorithm. In this example, the K-means clustering segmentation algorithm is a machine learning (ML) algorithm that divides data points (e.g., pixels) in an input image into groups with data points of similar traits (e.g., color, size, etc.). These example groups can be referred to as "clusters" or "segments." In some examples, the segmentation circuitry 202 can determine that at least one of the clusters corresponds to at least one of the object 106, the object 108, the object 110, or the trailer 102. At block 310, the example segmentation circuitry 202 can access a watershed segmentation algorithm, which is an algorithm that detects contours (e.g., edges, outlines, borders, etc.) in an example input image. These example contours may define regions (e.g., regions of interest) that correspond to segments or objects detected in the input image. In some examples, the segmentation circuitry 202 can determine that at least one of the regions corresponds to at least one of the object 106, the object 108, the object 110, or the trailer 102.

At block 312, the example characteristic determination circuitry 204 determines characteristics associated with at least one of the segments (e.g., clusters, regions, etc.) in the input image (e.g., the downscaled input image). If the at least one of the segments corresponds to the object 106, the characteristic determination circuitry 204 can determine a height, a width, a length, a volume, a density, a weight, etc., of the object 106. In some examples, the characteristic determination circuitry 204 can access the characteristic(s) from the database 114 (node 314). In other examples, the characteristic determination circuitry 204 can determine the characteristic(s) based on a reference image of a reference object (or reference trailer). In such examples, the characteristic determination circuitry 204 accesses the reference image from the database 114 and/or the network 116.

At block 316, the example vehicle control circuitry 104 can determine a weight (e.g., mass) estimation based on the volume of the object 106 and the density of the object 106. Example Equation 1, outlined below, represents a calculation for the weight of the example objects.

$$M_{Total} = \sum_{k=0}^{N} \mu_k * V_k \qquad (1)$$

In example Equation 1 above, $M_{Total}$ represents the total mass of example objects (e.g., the object 106, the object 108, the object 110, the trailer 102, etc.), k indicates a quantity of the example objects, N indicates the total number of the example objects, u is the density of the example object, and V is the volume of the example object. As such, the example vehicle control circuitry 104 can determine a total mass estimation for the objects 106, 108, 110 and the trailer 102 using Equation 1.

At block 318, the example vehicle control circuitry 104 can determine the Gross Trailer Weight (GTW). In some examples, when the threshold determination circuitry 206 determines that the threshold value is a towing capacity of the vehicle 100, then the characteristic comparison circuitry 208 can determine whether the GTW exceeds the towing capacity of the vehicle 100. Example Equation 2, outlined below, represents a calculation for GTW.

$$\text{Gross Trailer Weight}\,(GTW) = \qquad (2)$$
$$\text{Gross Combined Weight}\,(GCW) - \text{Gross Vehicle Weight}\,(GVW)$$

At block 320, the vehicle control circuitry 104 determines the Gross Vehicle Weight (GVW) by summing the weight of the vehicle 100 with the load on the vehicle 100. As used herein, the total weight of the vehicle 100 prior to coupling with the trailer 102 is referred to as the GVW. In some examples, the database 114 stores identifying information (e.g., product number, height, width, weight, density, etc.) about the vehicle 100. Accordingly, the vehicle control circuitry 104 can access a weight of the vehicle 100 from the database 114. In some examples, the load sensors 122 can determine a total load on the vehicle 100. As such, the vehicle control circuitry 104 can determine the GVW (e.g., weight of the vehicle+load on the vehicle=GVW).

At block 322, the example vehicle control circuitry 104 determines the Gross Combined Weight (GCW) of the vehicle 100 and the trailer 102. For example, the vehicle control circuitry 104 can sum the GVW with the measured loads from the trailer sensors 120 and the loads on the vehicle tongue 158 from the trailer hitch sensor 126. As such, the vehicle control circuitry 104 can determine the GCW as a sum of the GVW, the measured load on the trailer 102, and the measured load on the tongue 158.

At block 324, the vehicle control circuitry 104 can determine the Gross Trailer Weight (GTW) using Equation 2. For example, the vehicle control circuitry 104 can subtract the GVW from the GCW to determine the GTW. Then, the characteristic comparison circuitry 208 can determine whether the GTW exceeds the towing capacity of the vehicle 100.

While an example manner of implementing the vehicle control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example accessing circuitry 200, the example segmentation circuitry 202, the example characteristic determination circuitry 204, the example image comparison circuitry 212, the example association circuitry 214, the example threshold determination circuitry 206, the example characteristic comparison circuitry 208, the example operation determination circuitry 210 and/or, more generally, the example vehicle control circuitry 104 of FIG. 2, may be implemented by hardware alone or by hardware in combination with software and/or firmware. Thus, for example, any of the example accessing circuitry 200, the example segmentation circuitry 202, the example characteristic determination circuitry 204, the example image comparison circuitry 212, the example association circuitry 214, the example threshold determination circuitry 206, the example characteristic comparison circuitry 208, the example operation determination circuitry 210 and/or, more generally, the example vehicle control circuitry 104, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example vehicle control circuitry 104 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine readable instructions, which may be executed by programmable circuitry to implement and/or instantiate the vehicle control circuitry 104 of FIG. 2 and/or representative of example operations which may be performed by programmable circuitry to implement and/or instantiate the vehicle control circuitry 104 of FIG. 2, are shown in FIGS. 4-6. The machine readable instructions may be one or more executable programs or portion(s) of one or more executable programs for execution by programmable circuitry such as the programmable circuitry 712 shown in the example processor platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 4-6, many other methods of implementing the example vehicle control circuitry 104 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 4 is a flowchart representative of example machine readable instructions and/or example operations 400 that may be executed, instantiated, and/or performed by programmable circuitry to determine an example operating characteristic of an example vehicle. The example machine-readable instructions and/or the example operations 400 of FIG. 4 begin at block 402, at which the example threshold determination circuitry 206 determines an example threshold value associated with at least one of an example vehicle or an example trailer. For example, the threshold determination circuitry 206 determines an example threshold value associated with at least one of the vehicle 100 or the trailer 102. Example operations to implement block 402 are described below in connection with FIG. 5.

At block 404, the example accessing circuitry 200 accesses a first example image of an example region adjacent to the trailer, the region containing a first example object. For example, the accessing circuitry 200 accesses an input image of the region 112 adjacent to the trailer 102, the region 112 containing at least the object 106. In some examples, the accessing circuitry 200 accesses an input image of the region 112, the region containing the trailer 102. In some examples, the accessing circuitry 200 can access the image of the region 112 via at least one of the LiDAR sensor 128, the radar sensor 130, or the backup camera 124.

At block 406, the example segmentation circuitry 202 divides the first image into example segments, at least one of the segments corresponding to the first object. For example, the segmentation circuitry 202 divides the input image of the region 112 into example segments, at least one of the segments corresponding to the object 106. In some examples, the segmentation circuitry 202 divides the image of the object 106 into segments. In some examples, the segmentation circuitry 202 divides an input image into segments via image segmentation techniques (e.g., watershed segmentation, K-means clustering, etc.).

At block 408, the example characteristic determination circuitry 204 determines a first example characteristic of the first object. For example, the characteristic determination circuitry 204 determines a characteristic of the object 106. Example operations to implement block 408 are described below in connection with FIG. 6.

At block 410, the example characteristic comparison circuitry 208 compares the first characteristic of the first object to the threshold value. For example, the characteristic comparison circuitry 208 compares the characteristic of the object 106 to the threshold value. In some examples, the characteristic comparison circuitry 208 can compare the weight of the object 106 to the towing capacity of the trailer 102 (e.g., a first threshold value). In other examples, the characteristic comparison circuitry 208 can compare the weight of the trailer 102 to the towing capacity of the vehicle 100 (e.g., a second threshold value).

At block 412, the characteristic comparison circuitry 208 determines whether the first characteristic of the first object exceeds the threshold value. If the characteristic comparison circuitry 208 determines that the first characteristic of the first object exceeds the threshold value, the process proceeds to block 414. For example, the characteristic comparison circuitry 208 can compare the volume of the object 106 (e.g., 1,500 ft$^3$) to the volume capacity of the trailer 102 (e.g., 1,120 ft$^3$). Accordingly, the characteristic comparison circuitry 208 can determine that the volume of the object 106 exceeds the volume capacity of the trailer 102 (e.g., 1,500 ft$^3$>1,120 ft$^3$), and the process proceeds to block 414.

If the characteristic comparison circuitry 208 determines that the first characteristic of the first object satisfies the threshold value, the process proceeds to block 416. For example, the characteristic comparison circuitry 208 can compare the weight of the object 106 (e.g., 300 lbs.) to the towing capacity of the trailer 102 (e.g., 7,000 lbs.). Accordingly, the characteristic comparison circuitry 208 can determine that the weight of the object 106 does not exceed the threshold value (e.g., 300 lbs.<7,000 lbs.), and the process proceeds to block 416.

At block 414, the operation determination circuitry 210 determines at least one operating characteristic of the vehicle based on the comparison. For example, when the threshold value has been exceeded, the operation determination circuitry 210 can notify an operator of the vehicle 100 that the threshold value has been exceeded (e.g., via the user interface 156). In other examples, the operation determination circuitry 210 can determine a route for the vehicle 100 to execute to avoid sharp turns, avoid unpaved roads, avoid highways, etc. In some examples, the operation determination circuitry 210 can identify which of the object(s) 106, 108, 110 to remove to satisfy the threshold value. Then, the process ends.

At block 416, the example operation determination circuitry 210 can maintain an operation of the vehicle 100. For example, the operation determination circuitry 210 can maintain the speed of the vehicle 100, the route of the vehicle 100, etc. In other words, the operation determination circuitry 210 can determine that a change in operation is not needed. In other examples, the operation determination circuitry 210 can notify an operator of the vehicle 100 that the threshold value is satisfied. Then, the process ends.

FIG. 5 is a flowchart representative of example machine readable instructions and/or example operations that may be executed, instantiated, and/or performed by programmable circuitry to determine a threshold value associated with at least one of a vehicle or a trailer in connection with block 402 of FIG. 4. The example machine-readable instructions and/or the example operations of FIG. 5 begin at block 500, at which the segmentation circuitry 202 identifies a second example segment in the first image. For example, the segmentation circuitry 202 identifies a segment in the input image of the region 112 that corresponds to the trailer 102. In some examples, the segment corresponding to the trailer 102 includes at least one of a brand name of the trailer 102, a product number of the trailer 102, or a product name of the trailer 102. In other examples, the segment corresponding to the trailer 102 includes a shape of the trailer 102, a size of the trailer 102, a color of the trailer 102, etc.

At block 502, the example accessing circuitry 200 accesses a second image. For example, the accessing circuitry 200 can access an example image corresponding to an example reference trailer (e.g., via the network 116, from the database 114, etc.).

At block 504, the example image comparison circuitry 212 compares the second segment to the second image, the second image corresponding to the reference trailer, the reference trailer having a reference characteristic. For example, the image comparison circuitry 212 compares the segment corresponding to the trailer 102 to another example image corresponding to a reference trailer. In this example, the reference trailer has a reference characteristic (e.g., a known characteristic). For example, the reference trailer can be a flatbed trailer having a reference characteristic such as a towing capacity of 7,400 lbs.

At block 506, the example image comparison circuitry 212 determines whether the second segment matches the second image. If the segment corresponding to the trailer 102 matches the image of the reference trailer, then the process proceeds to block 508. For example, the image comparison circuitry 212 can determine that ridges, outlines, boundaries, etc., in the segment corresponding to the trailer 102 are similar to (e.g., follow a shape of) ridges, outlines, boundaries, etc., in the image of the reference trailer (e.g., via watershed segmentation). In other examples, the image comparison circuitry 212 can determine that the product number of the trailer 102 (indicated by the segment corresponding to the trailer 102) matches the product number of the reference trailer. Accordingly, the example image comparison circuitry 212 can determine that the segment corresponding to the trailer 102 matches the image of the reference trailer, and the process proceeds to block 508.

If the segment corresponding to the trailer 102 is different from (e.g., does not match) the image of the reference trailer, then the process proceeds to block 510. For example, the image comparison circuitry 212 can determine that ridges, outlines, boundaries, etc., in the segment corresponding to the trailer 102 are different from (e.g., have a different shape than) ridges, outlines, boundaries, etc., in the image of the reference trailer. Accordingly, the example image comparison circuitry 212 can determine that the segment corresponding to the trailer 102 does not match the image of the reference trailer, and the process proceeds to block 510.

At block 508, the example association circuitry 214 associates the trailer 102 with the reference trailer. For example, the association circuitry 214 can associate the trailer 102 with the flatbed trailer when the segment corresponding to the trailer 102 matches the image containing the flatbed trailer.

At block 512, the example threshold determination circuitry 206 determines the threshold value based on the reference characteristic. In some examples, the threshold determination circuitry 206 determines the threshold value based on the known characteristic of the reference trailer. For example, the characteristic determination circuitry 204 can determine that the trailer 102 may have a towing capacity of 7,400 lbs. because the reference trailer has a towing capacity of 7,400 lbs. Then, the process ends.

Returning to block 510, the example threshold determination circuitry 206 estimates the threshold value. For example, the threshold determination circuitry 206 can estimate the towing capacity or the weight capacity based on a size of the trailer 102, a shape of the trailer 102, a number of wheels of the trailer 102. Then, the process ends.

FIG. 6 is a flowchart representative of example machine readable instructions and/or example operations that may be executed, instantiated, and/or performed by programmable circuitry to determine a first characteristic of the object in connection with block 408 of FIG. 4. The example machine-readable instructions and/or the example operations of FIG. 6 begin at block 600, at which the example accessing circuitry 200 accesses a third image. For example, the accessing circuitry 200 accesses an image corresponding to an example reference object (e.g., via the network 116, via the database 114, etc.).

At block 602, the example image comparison circuitry 212 compares the at least one of the segments to the third image, the third image corresponding to the reference object, the reference object having a reference characteristic. For example, the example image comparison circuitry 212 compares the segment corresponding to the object 106 to the image corresponding to the reference object. In this example, the reference object has a reference characteristic. For example, the reference object can include a lawn mower having a reference characteristic such as a weight of 300 lbs. The example image comparison circuitry 212 can compare the image of the lawn mower to the segment corresponding to the object 106.

At block 604, the image comparison circuitry 212 determines whether the at least one of the segments matches the third image. If the segment corresponding to the object 106 matches the image of the reference object, then the process proceeds to block 606. For example, the segmentation circuitry 202 can determine that ridges, outlines, boundaries, etc., in the segment corresponding to the object 106 are similar to ridges, outlines, boundaries, etc., in the image of the reference object. Accordingly, the example image comparison circuitry 206 can determine that the segment corresponding to the trailer 102 matches the image of the reference trailer, and the process proceeds to block 606.

If the segment corresponding to the object 106 is different from the image of the reference object, then the process proceeds to block 608. For example, the image comparison circuitry 212 can determine that ridges, outlines, boundaries, etc., in the segment corresponding to the object 106 are different from ridges, outlines, boundaries, etc., in the image of the reference object. Accordingly, the example image comparison circuitry 212 can determine that the segment corresponding to the object 106 does not match the image of the reference object, and the process proceeds to block 608.

At block 606, the example association circuitry 214 associates the first object with the reference object. In some examples, the association circuitry 214 can associate the object 106 with the reference object when the segment corresponding to the object 106 matches the image containing the reference object. For example, the association circuitry 214 can associate the object 106 with the lawn mower when the segment corresponding to the object 106 matches the image containing the lawn mower.

At block 610, the example characteristic determination circuitry 204 determines the first characteristic of the first object based on the reference characteristic. For example, the characteristic determination circuitry 204 can determine a characteristic of the object 106 based on the known characteristic of the reference object. For example, the characteristic determination circuitry 204 can determine that the object 106 may weigh 300 lbs. because the reference object weighs 300 lbs. In some examples, the characteristic determination circuitry 204 can determine that the object 106 is the reference object and, as such, has the reference characteristic (and any other reference characteristics) of the reference object. Then, the process ends.

At block 608, the example characteristic determination circuitry 204 estimates the first characteristic of the first object. For example, the characteristic determination circuitry 204 can estimate the weight of the object 106 based on a size of object 106, a shape of the object 106, etc. Then, the process ends.

Figure 7:
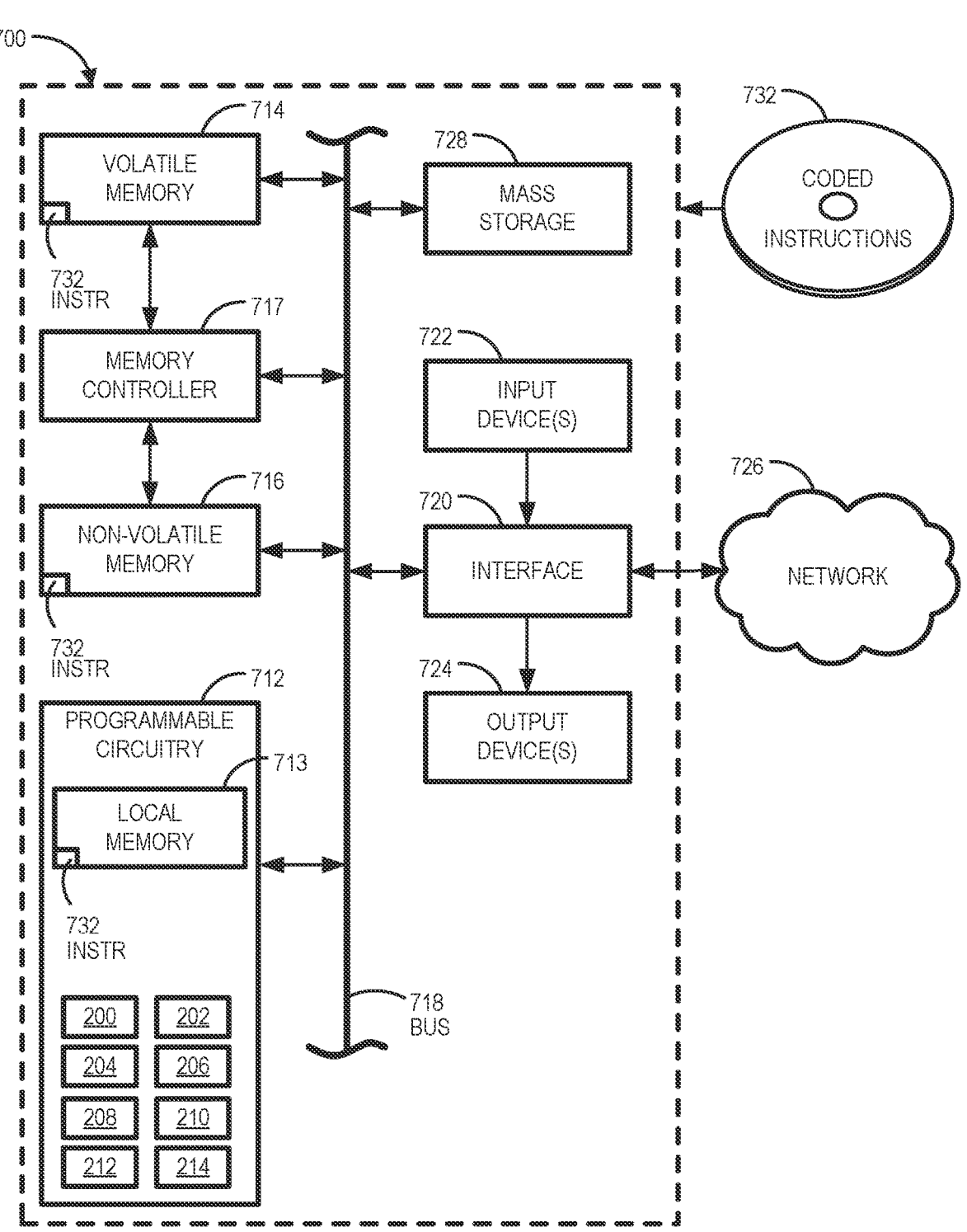
FIG. 7 is a block diagram of an example processing platform including programmable circuitry structured to execute, instantiate, and/or perform the example machine readable instructions and/or perform the example operations of FIGS. 4-6 to implement the vehicle control circuitry of FIG. 2.

FIG. 7 is a block diagram of an example programmable circuitry platform 700 structured to execute and/or instantiate the example machine-readable instructions and/or the example operations of FIGS. 4-6 to implement the vehicle control circuitry 104 of FIG. 2. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the example vehicle control circuitry 104, the example accessing circuitry 200, the example segmentation circuitry 202, the example characteristic determination circuitry 204, the example threshold determination circuitry 206, the example characteristic comparison circuitry 208, the example operation determination circuitry 210, the example image comparison circuitry 212, and the example association circuitry 214.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 4-6, may be stored in the mass storage device 728, in the volatile memory 714, in the non-volatile memory 716, and/or on at least one non-transitory computer readable storage medium such as a CD or DVD which may be removable.

Figure 8:
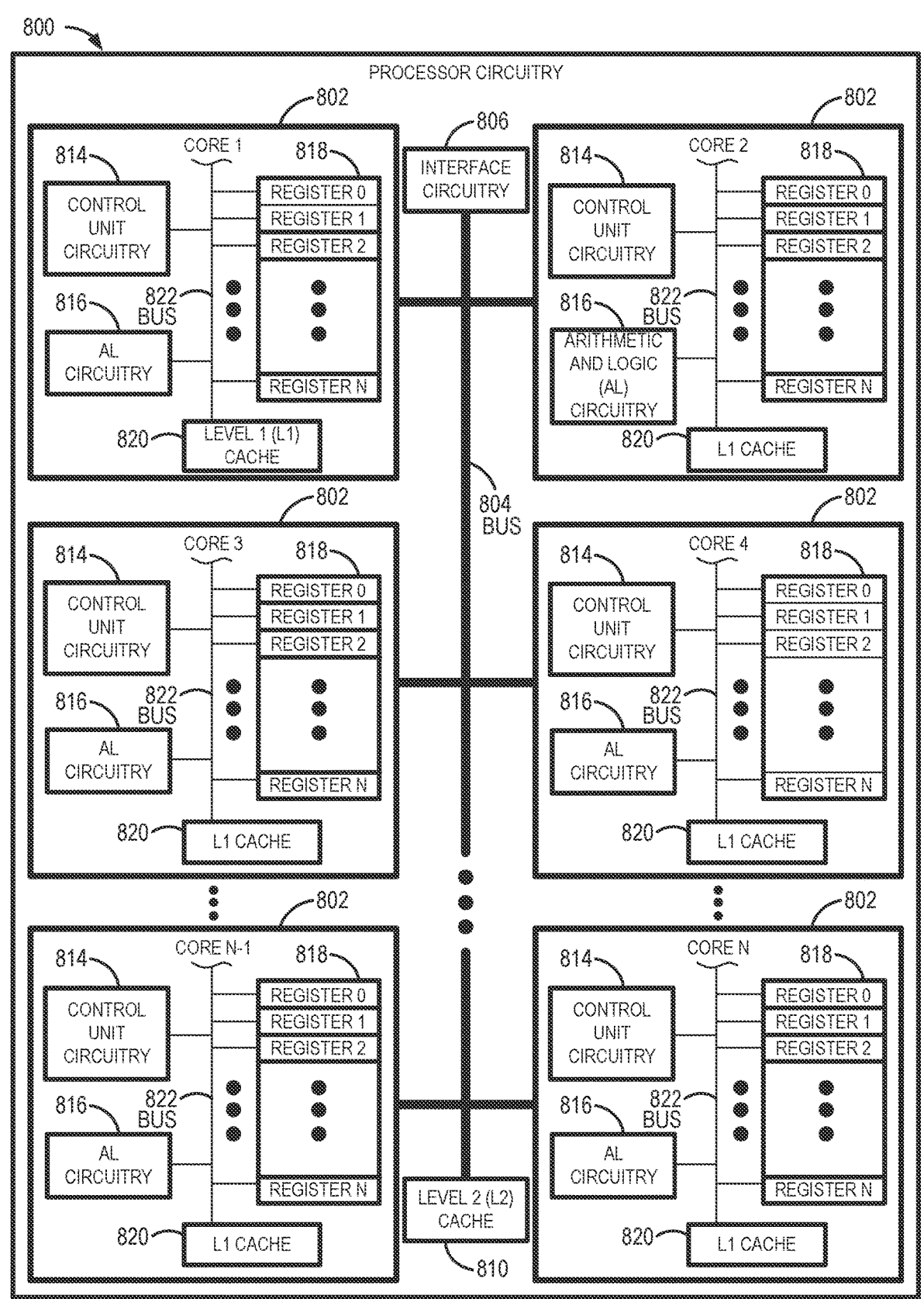
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 4-6 to effectively instantiate the circuitry of FIG. 2 as logic circuits to perform operations corresponding to those machine readable instructions. In some such examples, the circuitry of FIG. 2 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
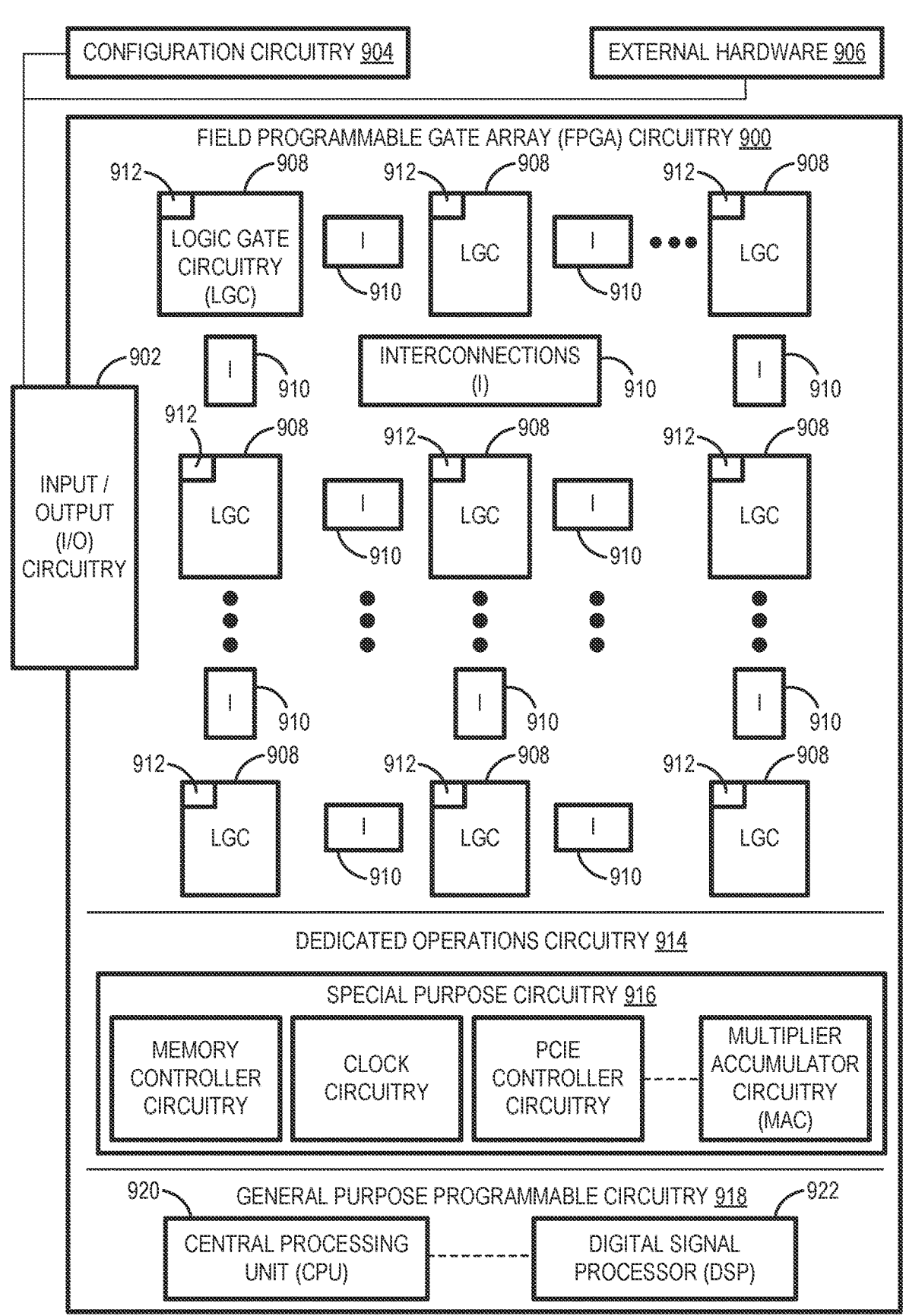
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart(s) of FIGS. 4-6 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4-6. As such, the FPGA circuitry 900 may be configured and/or structured to effectively instantiate some or all of the operations/functions corresponding to the machine readable instructions of the flowchart(s) of FIGS. 4-6 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIGS. 4-6 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof. In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIGS. 4-6 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 4-6 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 4-6, and/or an ASIC may be configured and/or structured to perform third operation(s)/function(s) corresponding to a third portion of the machine readable instructions represented by the flowcharts of FIGS. 4-6.

It should be understood that some or all of the circuitry of FIG. 2 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 2 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable micropro- cessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Process- ing Units (NPUs) one or more microcontrollers that may execute first instructions to perform one or more operations and/or functions and/or integrated circuits such as Applica- tion Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, induc- tors, resistors, current paths, diodes, etc. For example, an integrated circuit may be implemented as one or more of an ASIC, an FPGA, a chip, a microchip, programmable cir- cuitry, a semiconductor substrate coupling multiple circuit elements, a system on chip (SoC), etc.

From the foregoing, it will be appreciated that example systems, apparatus, articles of manufacture, and methods have been disclosed that ensure performance of a vehicle and trailer by monitoring load capacity. Disclosed examples capture images of objects to be placed (e.g., loaded) onto an example trailer. Example vehicle control circuitry disclosed herein employs image recognition techniques and image segmentation techniques to determine characteristics (e.g., weight) of the objects. Thus, examples disclosed herein can compare the object characteristics to a load capacity of the vehicle or the trailer. In some disclosed examples, the vehicle control circuitry can notify an operator when the object characteristic (or a sum of characteristics associated with multiple objects) has exceeded a load capacity (e.g., via a user interface). Therefore, disclosed examples can prevent excessive trailer loads and improve the maneuverability and steering of an example vehicle-trailer system. Further, dis- closed examples can capture images of an example trailer. As such, disclosed examples can utilize image recognition techniques to determine a load capacity of the trailer and notify an operator of the same.

Example 1 includes an apparatus comprising memory, instructions, and programmable circuitry to execute the instructions to determine a threshold value associated with at least one of a vehicle or a trailer, the trailer couplable to the vehicle, access an image containing an object to be placed in the trailer, divide the image into segments, at least one of the segments corresponding to the object, determine a char- acteristic of the object based on the at least one of the segments, compare the characteristic to the threshold value, and determine at least one operating characteristic of the vehicle based on the comparison.

Example 2 includes the apparatus of example 1, wherein the at least one operating characteristic includes at least one of a speed of the vehicle or a route associated with the vehicle.

Example 3 includes the apparatus of example 1, wherein at least one of watershed segmentation or K-means cluster- ing is used to divide the image into the segments.

Example 4 includes the apparatus of example 1, wherein the characteristic includes at least one of a weight of the object, a height of the object, a width of the object, a volume of the object, or a density of the object.

Example 5 includes the apparatus of example 1, wherein the image is a first image, the object is a first object, and the characteristic is a first characteristic, wherein the program- mable circuitry is to determine the first characteristic by comparing the at least one of the segments to a second image corresponding to a second object, the second object having a second characteristic, associating the first object with the second object when the at least one of the segments matches the second image, and determining the first characteristic of the first object based on the second characteristic.

Example 6 includes the apparatus of example 5, wherein the programmable circuitry is to access the second image via an Internet.

Example 7 includes the apparatus of example 1, wherein the programmable circuitry is to determine the threshold value by determining a weight of the trailer.

Example 8 includes the apparatus of example 7, wherein the programmable circuitry is to determine the weight of the trailer by subtracting a weight of the vehicle from a com- bined weight of the vehicle and the trailer.

Example 9 includes the apparatus of example 7, wherein the programmable circuitry is to access the weight of the trailer via at least one of load sensors coupled to the trailer, ride height sensors coupled to the trailer, or strain based sensors coupled to the trailer.

Example 10 includes the apparatus of example 7, wherein the trailer is coupled to the vehicle via a tongue, wherein the weight of the trailer is a load on the tongue, the load on the tongue measured by a trailer hitch sensor.

Example 11 includes the apparatus of example 10, wherein the programmable circuitry is to determine the threshold value by accessing a towing capacity associated with the tongue.

Example 12 includes the apparatus of example 10, wherein the weight of the trailer is a percentage of the load on the tongue.

Example 13 includes a non-transitory computer readable storage medium comprising instructions that, when executed, cause programmable circuitry to at least determine a threshold value associated with at least one of a vehicle or a trailer, the trailer couplable to the vehicle, access an image containing an object to be placed in the trailer, divide the image into segments, at least one of the segments corresponding to the object, determine a characteristic of the object based on the at least one of the segments, compare the characteristic to the threshold value, and determine at least one operating characteristic of the vehicle based on the comparison.

Example 14 includes the non-transitory computer readable storage medium of example 13, wherein the at least one operating characteristic of the vehicle includes at least one of a speed of the vehicle or a route associated with the vehicle.

Example 15 includes the non-transitory computer readable storage medium of example 13, wherein at least one of watershed segmentation or K-means clustering is used to divide the image into the segments.

Example 16 includes the non-transitory computer readable storage medium of example 13, wherein the characteristic includes at least one of a weight of the object, a height of the object, a width of the object, a volume of the object, or a density of the object.

Example 17 includes the non-transitory computer readable storage medium of example 13, wherein the image is a first image, the object is a first object, and the characteristic is a first characteristic, wherein the instructions, when executed, are to cause the programmable circuitry to determine the first characteristic by comparing the at least one of the segments to a second image corresponding to a second object, the second object having a second characteristic, associating the first object with the second object when the at least one of the segments matches the second image, and determining the first characteristic of the first object based on the second characteristic.

Example 18 includes a method comprising determining, by executing an instruction with programmable circuitry, a threshold value associated with at least one of a vehicle or a trailer, the trailer couplable to the vehicle, accessing, by executing an instruction with the programmable circuitry, an image containing an object to be placed in the trailer, dividing, by executing an instruction with the programmable circuitry, the image into segments, at least one of the segments corresponding to the object, determining, by executing an instruction with the programmable circuitry, a characteristic of the object based on the at least one of the segments, comparing, by executing an instruction with the programmable circuitry, the characteristic to the threshold value, and determining, by executing an instruction with the programmable circuitry, at least one operating characteristic of the vehicle based on the comparison.

Example 19 includes the method of example 18, wherein the image is a first image, the object is a first object, and the characteristic is a first characteristic, further including determining the first characteristic by comparing the at least one of the segments to a second image corresponding to a second object, the second object having a second characteristic, associating the first object with the second object when the at least one of the segments matches the second image, and determining the first characteristic of the first object based on the second characteristic.

Example 20 includes the method of example 18, wherein the characteristic is a first characteristic, further including determining the threshold value by comparing an image containing the trailer to an image corresponding to a reference trailer, the reference trailer having a second characteristic, associating the trailer with the reference trailer based on the comparison, and determining the threshold value based on the second characteristic.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   memory;
   instructions; and
   programmable circuitry to execute the instructions to:
   access an image containing an object placed in a trailer couplable to a vehicle;
   divide the image into segments, the segments including a first one or more segments corresponding to the object and a second one or more segments corresponding to the trailer;
   determine a characteristic of the object based on the first one or more segments;
   determine a threshold value of at least one of the trailer or the vehicle based on the second one or more segments;
   compare the characteristic to the threshold value; and
   determine at least one operating characteristic of the vehicle based on the comparison.

2. The apparatus of claim 1, wherein the at least one operating characteristic includes at least one of a speed of the vehicle or a route associated with the vehicle.

3. The apparatus of claim 1, wherein at least one of watershed segmentation or K-means clustering is used to divide the image into the segments.

4. The apparatus of claim 1, wherein the characteristic includes at least one of a weight of the object, a height of the object, a width of the object, a volume of the object, or a density of the object.

5. The apparatus of claim 1, wherein the image is a first image, the object is a first object, and the characteristic is a first characteristic, wherein the programmable circuitry is to determine the first characteristic by:
   comparing the at least one of the segments to a second image corresponding to a second object, the second object having a second characteristic;
   associating the first object with the second object when the at least one of the segments matches the second image; and
   determining the first characteristic of the first object based on the second characteristic.

6. The apparatus of claim 5, wherein the programmable circuitry is to access the second image via an Internet.

7. The apparatus of claim 1, wherein the programmable circuitry is to determine the threshold value by determining a weight of the trailer.

8. The apparatus of claim 7, wherein the programmable circuitry is to determine the weight of the trailer by subtracting a weight of the vehicle from a combined weight of the vehicle and the trailer.

9. The apparatus of claim 7, wherein the programmable circuitry is to access the weight of the trailer via at least one of load sensors coupled to the trailer, ride height sensors coupled to the trailer, or strain based sensors coupled to the trailer.

10. The apparatus of claim 7, wherein the trailer is coupled to the vehicle via a tongue, wherein the weight of the trailer is a load on the tongue, the load on the tongue measured by a sensor coupled to the tongue.

11. The apparatus of claim 10, wherein the programmable circuitry is to determine the threshold value by accessing a towing capacity associated with the tongue.

12. The apparatus of claim 10, wherein the weight of the trailer is estimated to be a percentage of the load on the tongue.

13. A non-transitory computer readable storage medium comprising instructions that, when executed, cause programmable circuitry to at least:

access an image containing an object to be placed in a trailer couplable to a vehicle;

divide the image into segments, of the segments including a first one or more segments corresponding to the object and a second one or more segments corresponding to the trailer;

determine a characteristic of the object based on the first one or more segments;

determine a threshold value of at least one of the trailer or the vehicle based on the second one or more segments;

compare the characteristic to the threshold value; and determine at least one operating characteristic of the vehicle based on the comparison.

14. The non-transitory computer readable storage medium of claim 13, wherein the at least one operating characteristic of the vehicle includes at least one of a speed of the vehicle or a route associated with the vehicle.

15. The non-transitory computer readable storage medium of claim 13, wherein at least one of watershed segmentation or K-means clustering is used to divide the image into the segments.

16. The non-transitory computer readable storage medium of claim 13, wherein the characteristic includes at least one of a weight of the object, a height of the object, a width of the object, a volume of the object, or a density of the object.

17. The non-transitory computer readable storage medium of claim 13, wherein the image is a first image, the object is a first object, and the characteristic is a first characteristic, wherein the instructions, when executed, are to cause the programmable circuitry to determine the first characteristic by:

comparing the at least one of the segments to a second image corresponding to a second object, the second object having a second characteristic;

associating the first object with the second object when the at least one of the segments matches the second image; and determining the first characteristic of the first object based on the second characteristic.

18. A method comprising:

accessing, by executing an instruction with programmable circuitry, an image containing an object placed or to be placed in a trailer couplable to a vehicle;

dividing, by executing an instruction with the programmable circuitry, the image into segments, the segments including a first one or more segments corresponding to the object and a second one or more segments corresponding to the trailer;

determining, by executing an instruction with the programmable circuitry, a characteristic of the object based on the first one or more segments;

determining, by executing an instruction with the programmable circuitry, a threshold value of at least one of the trailer or the vehicle based on the second one or more segments;

comparing, by executing an instruction with the programmable circuitry, the characteristic to the threshold value; and determining, by executing an instruction with the programmable circuitry, at least one operating characteristic of the vehicle based on the comparison.

19. The method of claim 18, wherein the image is a first image, the object is a first object, and the characteristic is a first characteristic, further including determining the first characteristic by:

comparing the at least one of the segments to a second image corresponding to a second object, the second object having a second characteristic;

associating the first object with the second object when the at least one of the segments matches the second image; and determining the first characteristic of the first object based on the second characteristic.

20. The method of claim 18, wherein the characteristic is a first characteristic, further including determining the threshold value by:

comparing an image containing the trailer to an image corresponding to a reference trailer, the reference trailer having a second characteristic;

associating the trailer with the reference trailer based on the comparison; and determining the threshold value based on the second characteristic.

\* \* \* \* \*